United States Patent
Grose et al.

(10) Patent No.: US 7,283,343 B2
(45) Date of Patent: Oct. 16, 2007

(54) INTEGRATED REVERSE BATTERY PROTECTION CIRCUIT FOR AN EXTERNAL MOSFET SWITCH

(75) Inventors: William E. Grose, Plano, TX (US); Timothy J. Legat, McKinney, TX (US); Sanmukh M. Patel, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 398 days.

(21) Appl. No.: 11/015,315

(22) Filed: Dec. 15, 2004

(65) Prior Publication Data

US 2006/0126245 A1 Jun. 15, 2006

(51) Int. Cl.
*H02H 3/18* (2006.01)
(52) U.S. Cl. .................................................... 361/84
(58) Field of Classification Search ................ 361/84
See application file for complete search history.

(56) References Cited

U.S. PATENT DOCUMENTS

| 4,992,683 A * | 2/1991 | Robin, Jr. ................ 327/432 |
| 6,043,965 A * | 3/2000 | Hazelton et al. .............. 361/84 |
| 2004/0228053 A1* | 11/2004 | Thiery et al. ................. 361/84 |

FOREIGN PATENT DOCUMENTS

JP 06-129337 * 5/1994

* cited by examiner

*Primary Examiner*—Ronald W. Leja
(74) *Attorney, Agent, or Firm*—J. Dennis Moore; W. James Brady, III; Frederick J. Telecky, Jr.

(57) ABSTRACT

A reverse battery protection circuits that provides an integrated reverse battery condition solution for protection of external NMOS switches during the reverse battery condition is disclosed herein. This reverse battery protection circuit minimizes power consumption during a reverse battery event wherein there is no need for mechanical adjustments such as heat sinking and clamping to extract the heat away from the silicon and not destroy the device. Specifically, the reverse battery protection circuit includes a push-pull gate drive circuit coupled between the first and second power supply rail. A protection subcircuit portion connects between a first output node and the second power supply rail to turn the external FET 'on' during the reverse battery condition. In particular, the protection subcircuit portion connects to the external FET device and includes a p-channel device connected between a second output node that biases the external FET device and a first diode. A resistor connects between a first output node of the reverse battery protection circuit to provide a voltage drop between the drain terminal and the gate of the p-channel device. A second diode connects between the gate and the source of the p-channel device. In addition, a clamping circuit connects between the second output node and the third output node to provide clamping in the instance where the voltage at the second output node momentarily rises too high.

13 Claims, 1 Drawing Sheet

INTEGRATED REVERSE BATTERY PROTECTION CIRCUIT FOR AN EXTERNAL MOSFET SWITCH

FIELD OF THE INVENTION

The present invention relates to reverse battery protection circuits and, more particularly, a reverse battery protection circuit for an external MOSFET switch.

BACKGROUND OF THE INVENTION

Operation of all integrated circuits (ICs) depends upon a power supply having a potential difference for use in powering internal integrated circuit components to ensure their operation. It is common for the power supply battery to be inadvertently reversed, thereby reversing the bias of the applied potential difference. In the automotive industry, for example, during a jump start, a battery may be mistakenly connected backwards to a circuit wherein the negative supply connects to the positive power rail and the positive supply connects to the negative power rail. As a result, severe damage to integrated circuits connected to the power supply occurs without any form of reverse bias protection between the integrated circuit and the applied potential difference. Moreover, this extreme condition of reverse battery can cause excessive power consumption.

There, however, are numerous ways that reverse bias protection may be implemented within an integrated circuit design. Common reverse bias protection circuitry include current-limiting resistors, diodes or MOS-transistors in series with a big pass transistor. Big pass transistors are used in integrated circuit design to enable a large flow of current within the integrated circuit. Yet, during the reverse bias condition, damage will result. Thus, these components may be connected in series with the big pass transistor for protection. These components, however, tend to pass the same amount of large current as the big pass transistor. Thereby, current-limiting resistors, diodes and MOS transistors connected in series with the big pass transistor may cause undesired voltage drops.

For example a known reverse bias protection circuit includes a high current discrete diode placed in series between the power source and the positive power supply terminal that connects the integrated circuits requiring protection. Accordingly, during a reverse voltage condition, the battery simply reverse biases the diode and protects the integrated circuits. The voltage drop across the diode, however, reduces the actual DC voltage available to the integrated.

Conventionally, a MOSFET driver is connected between the positive terminal of a device and a positive supply terminal as a high side voltage switch for reverse bias protection. During operation, when the MOSFET driver is conducting current, a positive voltage is connected to the positive terminal of the integrated circuit. When the MOSFET driver, however, is not conducting current during the reverse biased condition, the MOSFET driver provides reverse battery protection to the integrated circuit by shorting the positive supply voltage to ground through its backgate diode.

Most reverse battery protection circuitry, however, are designed to protect the components on the integrated circuit (IC) board or silicon chip alone, such that the electronics on board the IC would protect the rest of the electronics on board the IC. There are some applications, however, in which the reverse battery protection is necessary to protect external component connected to the IC. One such external component may be an external drive FET. Presently, there is no known design that will protect external components. During the reverse battery condition, if the external drive FET is not protected nor turned on, current path develops through the load and forward biases backgate diode of the external drive FET. As a result, a considerable amount of voltage is dropped across the external drive FET and, therefore, a considerable amount of energy is dissipated across the external drive FET, which is something most manufacturers desire to avoid. This power expenditure caused by the reverse battery condition affects functionality and reliability of the system including this IC and external drive FET.

As is displayed in FIG. 1, most automotive systems include a reverse battery protection circuit having a reverse blocking diode $d_6$ placed in series with the load. As a result, the load is never energized. Thereby, no path exists for current to flow from the source to the ground plane depending upon the polarity. Yet, there are some applications that require that the load remain energized.

Thus, there is a need for a reverse battery protection circuit that provides an integrated reverse battery condition solution for protection of external NMOS switches during the reverse battery condition. This reverse battery protection circuit must minimize power consumption during a reverse battery event wherein there is no need for mechanical adjustments such as heat sinking and clamping to extract the heat away from the silicon and not destroy the device. There is a need for system modules that ensure a robust design for handling the increased power dissipation during the reverse battery condition.

The present invention is directed to overcoming, or at least reducing the effects of one or more of the problems set forth above.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

To address the above-discussed deficiencies of reverse battery protection circuits, the present invention teaches a reverse battery protection circuit that provides an integrated reverse battery condition solution for protection of external NMOS switches during the reverse battery condition. This reverse battery protection circuit minimizes power consumption during a reverse battery event wherein there is no need for mechanical adjustments such as heat sinking and clamping to extract the heat away from the silicon and not destroy the device. In addition, this novel design protects the external FET devices during the reverse battery condition without the use of a reverse blocking diode.

Specifically, the reverse battery protection circuit includes a push-pull gate drive circuit coupled between the first and second power supply rail. A protection subcircuit portion connects between a first output node and the second power supply rail to turn the external FET 'on' during the reverse battery condition. A clamping circuit connects between the second output node and the third output node to provide clamping in the instance where the voltage at the second output node momentarily rises too high.

In particular, the protection subcircuit portion includes a first resistor that connects between the first output node and a first node. A first diode connects between the first node and a second node. Accordingly, a first p-channel device connects between the second output node and the second node, wherein this device is biased by the first node. A second diode connects between the second node and ground.

An objective of this design is to turn the external FET on such that the power dissipation is limited due to the intrinsic diode of the external FET. In this condition, the current path generated by the reverse battery condition is less resistive and therefore dissipates less energy.

The advantages include but are not limited to a reverse battery protection circuit that provides an integrated reverse battery condition solution. Protection of external NMOS switches during reverse battery. Minimize power consumption during a reverse battery event. Simplify system and module design due to reverse battery protection contained within the integrated circuit.

The following description and annexed drawings set forth in detail certain illustrative aspects and implementations of the invention. These are indicative of but a few of the various ways in which the principles of the invention may be employed.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF PREFERRED EMBODIMENTS

Figure 1:
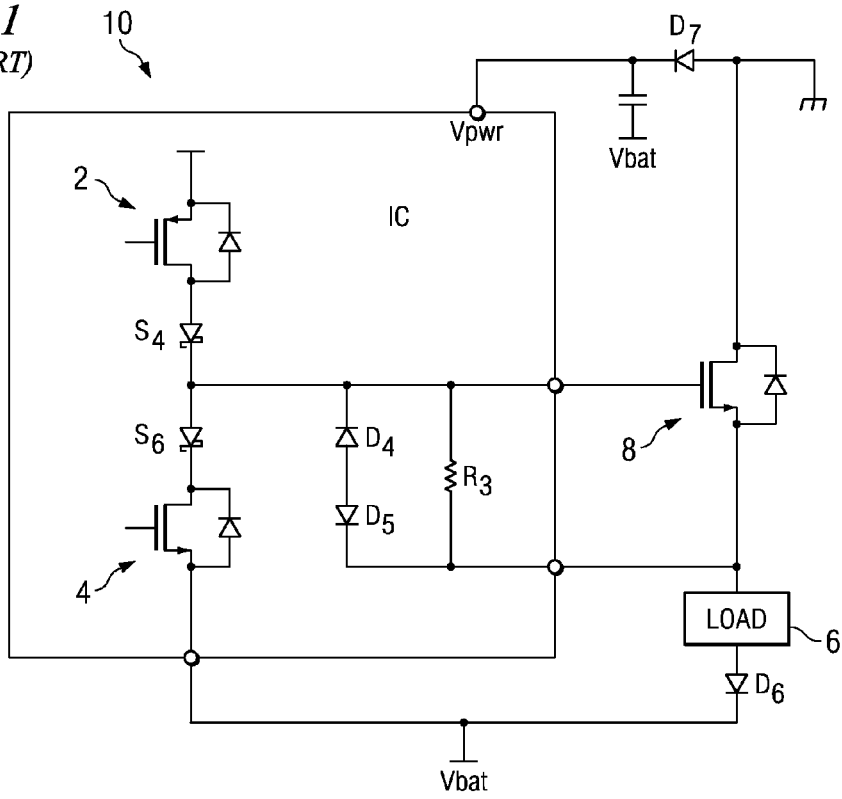
FIG. 1 is a known reverse battery protection circuit.

One or more exemplary implementations of the present invention will now be described with reference to the attached drawings, wherein like reference numerals are used to refer to like elements throughout. The various aspects of the invention are illustrated below in a reverse battery, although the invention and the appended claims are not limited to the illustrated examples.

Figure 2:
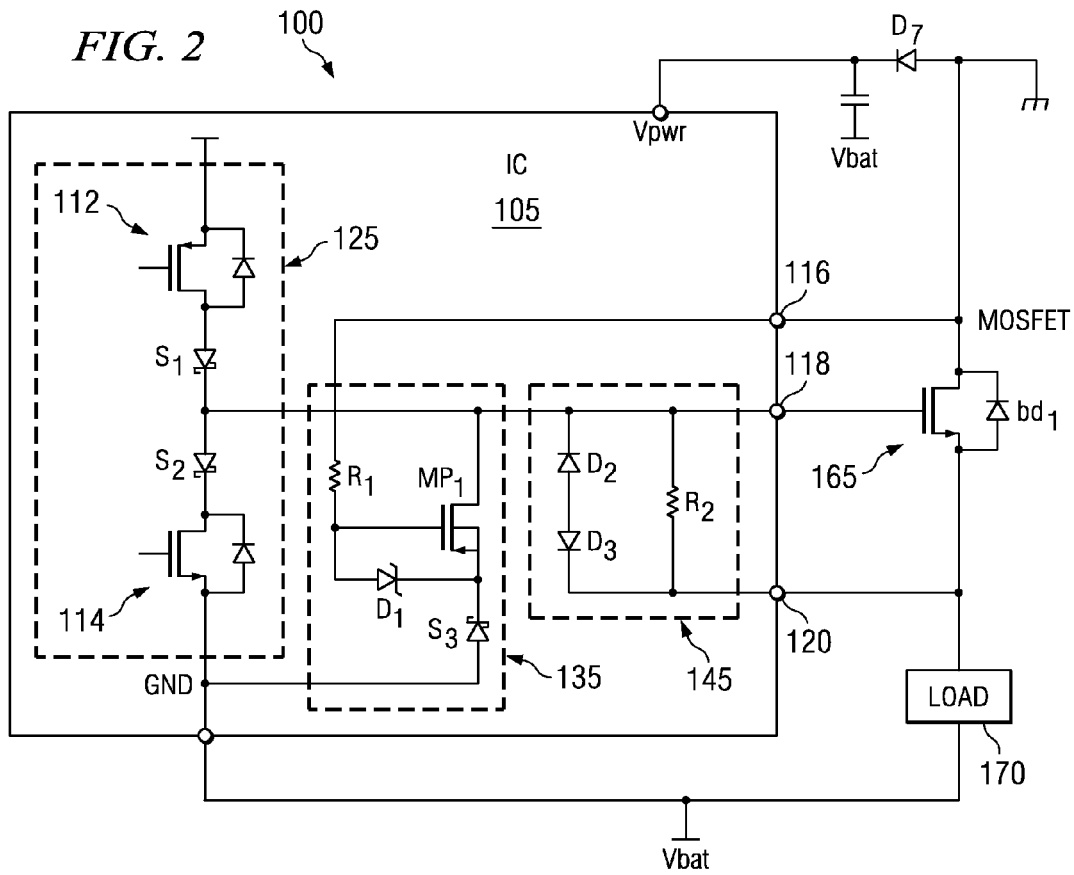
FIG. 2 illustrates a reverse battery protection circuit in accordance with the present invention.

As shown in FIG. 2, a reverse battery is applied to the external FET 165, where voltage of the battery $V_{bat}$ is being applied to the ground pin GND and the ground pin GND is being applied to the power side of the external FET 165. This condition represents the well-known reverse battery condition. Typically, it is a gross mistake where a module that includes the IC has been plugged in inappropriately or where battery cables are reversed, i.e. in a hypothetical jump start of an automobile. Without the protection of the reverse battery protection circuit 100 in accordance with the present invention, one can see that the current will go through load 170 and through backgate diode $bd_1$. As a result, this current surge will go directly to the second power rail or ground GND. Thereby, the only current that exists will be dissipated through backgate diode $bd_1$.

With the use of the reverse battery protection circuit 100, however, circuit 100 minimizes the power dissipation of the external FET 165 through a clamping scheme. Specifically, this reverse battery protection circuit 100 in accordance with the present invention, shown in FIG. 2, includes a first output node 116, a second output node 118 and a third output node 120. There are three subcircuit portions, 125, 135, and 145, that are configured to implement reverse battery protection circuit 100. The first subcircuit portion 125 represents a push-pull circuit that connects between the first power supply rail and the second power supply rail or ground GND. A first p-channel device 112 connects between the first power supply rail and a first node. A first diode $S_1$ connects between the first node and the second output node 118 which is formed to bias the external FET device 165. A second diode $S_2$ connects between the second output node 118 and a second node. A first n-channel device 114 connects between the second node and ground GND. A reverse battery fault requires this addition of blocking Schottky diodes, $S_1$ and $S_2$, in gate drive circuitry. The purpose of the first subcircuit portion 125 is to provide this additional blocking of current. Specifically, diodes, $S_1$ and $S_2$, represent a push-pull output design that are customary in output gate drives. Diodes, $S_1$ and $S_2$, are added to make sure that during reverse battery, reverse conduction does not exist through the push-pull circuitry comprising devices 112 and 114. Thereby, diodes, $S_1$ and $S_2$, protect the internal components against the reversed battery condition as opposed to the second subcircuit portion 135 which is designed to protect external components.

This second subcircuit portion 135 represents a reverse battery protection circuit for the external FET 165 and is responsible for maintaining the external FET in the 'on' state. Subcircuit portion 135 connects between the first output node 116 and ground GND. Specifically, second subcircuit portion 135 includes a first resistor $R_1$ connected between the first output node 116 and a third node. A third diode $d_1$ connects between the third node and a fourth node. A second p-channel device $MP_1$ connects between the second output node 118 and the fourth node, wherein the p-channel device $MP_1$ is biased by the third node. A fourth diode $S_4$ connects between the source of p-channel device $MP_1$ and ground GND. Resistor $R_1$ provides a voltage drop between the drain of the external device 165 and the gate of p-channel device $MP_1$. Without the novel subcircuit portion 135 of the protection IC 100, the external FET 165 would remain in an 'off' state and the only current dissipation that would exist would be that which flows through the backgate diode $bd_1$ of the external FET 165. As a result, the external FET 165 would dissipate a large amount of energy. Second subcircuit portion 135 eliminates this problem.

The third subcircuit portion 145 represents a clamping circuit that includes a series connected diode pair, $d_2$ and $d_3$, connected in parallel to a second resistor $R_2$ between the second output node 118 and the third output node 120. This subcircuit portion 145 provides clamping in the instance where the voltage at the second output node 118 momentarily rises too high. This clamping circuit 145 would clamp the second output node 118 at a lower voltage and, yet, not over-burden the gate of the external FET 165.

In operation, during normal conditions device $MP_1$ is off. During a reverse battery condition, however, device $MP_1$ is turned on. As a result, the battery voltage is applied directly to the second output node 118. Accordingly, the external FET 165 connected to the second output node 118 is turned on. The first output node 116 is held at ground GND. The current from the battery voltage $V_{bat}$ goes through the diode $S_3$ and the series connected diode pair, $d_2$ and $d_3$. As a result, a voltage drop exists across the gate of device $MP_1$. Accordingly, device $MP_1$ turns on and the current goes through the second output node 118 which applies a voltage that pulls up the gate of the external FET 165. Thus, during a reverse battery condition, the drain of the external FET 165 is held at ground GND and the gate of the external FET 165 will be charged directly through the Schottky diode $d_1$ and p-channel device $MP_1$ to place the external FET 165 on and in the forward active region. This will minimize power consumption in the external FET 165 due to the forward biased body diode under the reverse battery condition. Care needs to be taken to ensure that the gate-source clamping diodes, $d_2$ and $d_3$, and pin ESD structures are configured to block current entering the second power supply rail or ground GND connection such that sneak paths through substrate that could back feed supply nodes are blocked.

This reverse battery protection circuit 100 provides a path for the current resulting from the reverse battery condition. Circuit 100 minimizes the power dissipation such that there is no need for mechanical adjustments such as heat sinking and clamping to extract the heat away from the silicon and not destroy the device. Thereby, this circuit 100 protects an external FET 165 during the reverse battery condition without the use of a reverse blocking diode $d_6$ as is shown in FIG. 1. Therein, circuit 100 turns on the external FET 165 such that external FET 165 is able to handle the energy that is being diverted along its path. As a result, load 170 is shunted with the inherent drain-to-source resistance $r_{ds}$ of the external FET 165 in the reverse direction. Accordingly, the power dissipated is minimized by 60%-75% depending upon how hard the external FET 165 turns on.

There are several applications for the reverse battery protection circuitry 100 in accordance with the present invention. First, this protective circuitry 100 could be used in an automotive application or in an external driver. Secondly, this protective circuitry 100 could also be used in regular and incandescent headlamps applicable to any application that requires protection or minimizing power dissipation of an external FET during the reversing of the polarity of a DC power supply. Moreover, this device 100 may be used for an external or internal FET. Specifically, circuit 100 may substitute for an output gate drive on any IC.

The advantages include but are not limited to a reverse battery protection circuit that provides an integrated reverse battery condition solution. Protection of external NMOS switches during reverse battery. Minimize power consumption during a reverse battery event. Simplify system and module design due to reverse battery protection contained within the integrated circuit.

While the principles of the present invention have been demonstrated with particular regard to the structures and methods disclosed herein, it will be recognized that various departures may be undertaken in the practice of the invention. The scope of the invention is not intended to be limited to the particular structures and methods disclosed herein, but should instead be gauged by the breadth of the claims that follow.

Those of skill in the art will recognize that the physical location of the elements illustrated in FIG. 2 can be moved or relocated while retaining the function described above.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A reverse battery protection circuit coupled between a first and second power supply rail, the reverse battery protection circuit having a first, a second and a third output node, wherein an external switching device couples between the first output node and the third output node and wherein the external switching device is biased by the second output node, and wherein a load couples between the third output node and the second power supply rail comprising:
    a push-pull gate drive circuit coupled between the first and second power supply rail;
    a protection subcircuit portion coupled between the first output node and the second power supply rail, the protection subcircuit portion comprises,
    a first resistor coupled between the first output node and a first node,
    a first diode coupled between the first node and a second node,
    a first p-channel device coupled between the second output node and
    the second node, wherein first p-channel device is biased by the first node,
    a second diode coupled between the second node and ground; and
    a clamping circuit coupled between the second output node and the third output node.

2. The reverse battery protection circuit as recited in claim 1, wherein the push-pull gate drive circuit comprises:
    a second p-channel device coupled between the power supply rail and a third node;
    a third diode coupled between the third node and the second output node;
    a fourth diode coupled between the second output node and a fourth node; and
    a n-channel device coupled between the fourth node and grounds.

3. The reverse battery protection circuit as recited in claim 1, wherein the clamping circuit comprises,
    a third diode coupled to the second output node;
    a fourth diode coupled in series between the third diode and the third output node; and
    a second resistor coupled in parallel across the series connected third and fourth diodes.

4. The reverse battery protection circuit as recited in claim 1, the first diode is a Zener diode.

5. The reverse battery protection circuit as recited in claim 1, the second diode, is a Schottky diode.

6. The reverse battery protection circuit as recited in claim 1, wherein the first p-channel device is a P-type transistor.

7. The reverse battery protection circuit as recited in claim 6, wherein the first P-type transistor is a metal oxide semiconductor field-effect transistor.

8. The reverse battery protection circuit as recited in claim 2, the third and fourth diodes are Schottky diodes.

9. The reverse battery protection circuit as recited in claim 2, wherein the second p-channel device is a P-type transistor.

10. The reverse battery protection circuit as recited in claim 9, wherein the second P-type transistor is a metal oxide semiconductor field-effect transistor.

11. The reverse battery protection circuit as recited in claim 2, wherein the n-channel device is a N-type transistor.

12. The reverse battery protection circuit as recited in claim 11, wherein the N-type transistor is a metal oxide semiconductor field-effect transistor.

13. The reverse battery protection circuit as recited in claim 3, the third and fourth diodes are Zener diodes.

* * * * *